United States Patent [19]

Drozella

[11] 4,252,439
[45] Feb. 24, 1981

[54] LASER ALIGNMENT APPARATUS

[75] Inventor: Rolf Drozella, Dorsten, Fed. Rep. of Germany

[73] Assignee: Hochtief AG für Hoch- und Tiefbauten vorm. Gebr. Helfmann, Essen, Fed. Rep. of Germany

[21] Appl. No.: 907,625

[22] Filed: May 19, 1978

[30] Foreign Application Priority Data

May 21, 1977 [DE] Fed. Rep. of Germany ....... 2723095

[51] Int. Cl.³ .............................................. G01B 11/26
[52] U.S. Cl. ..................................... 356/153; 356/138
[58] Field of Search .......................... 356/138, 152–153

[56] References Cited

U.S. PATENT DOCUMENTS

| 3,813,170 | 5/1974 | Sears | 356/138 |
|---|---|---|---|
| 3,897,637 | 8/1975 | Genho | 356/138 |
| 3,942,894 | 3/1976 | Maier | 356/153 |
| 4,027,210 | 3/1977 | Weber | 356/152 |
| 4,135,823 | 1/1975 | Hörvallius | 356/153 |

FOREIGN PATENT DOCUMENTS 2403239  8/1975  Fed. Rep. of Germany .

Primary Examiner—John K. Corbin
Assistant Examiner—Wm. H. Punter
Attorney, Agent, or Firm—Karl F. Ross

[57] ABSTRACT

A building being erected is aligned with the vertical by projecting a main laser beam horizontally and splitting it into a vertically reflected test beam that is received on the building and used to ascertain proper alignment thereof with the vertical and a horizontally reflected adjustment beam that is received at a detector having an array of receptors around a central receptor. So long as the adjustment beam is received at the central receptor, the proper vertical positioning of the test beam is insured. If the adjustment beam moves off the center receptor, however, a positioning motor connected to the projector is actuated to reposition the main beam and the splitter to as to realign the adjustment beam with the central receptor and simultaneously realign the test beam with the vertical.

2 Claims, 5 Drawing Figures

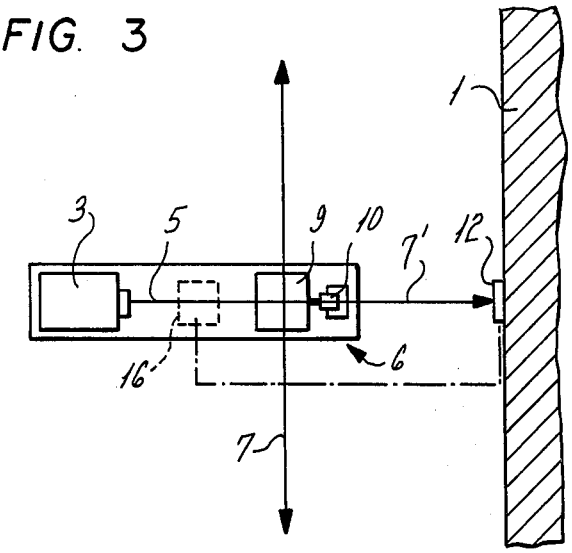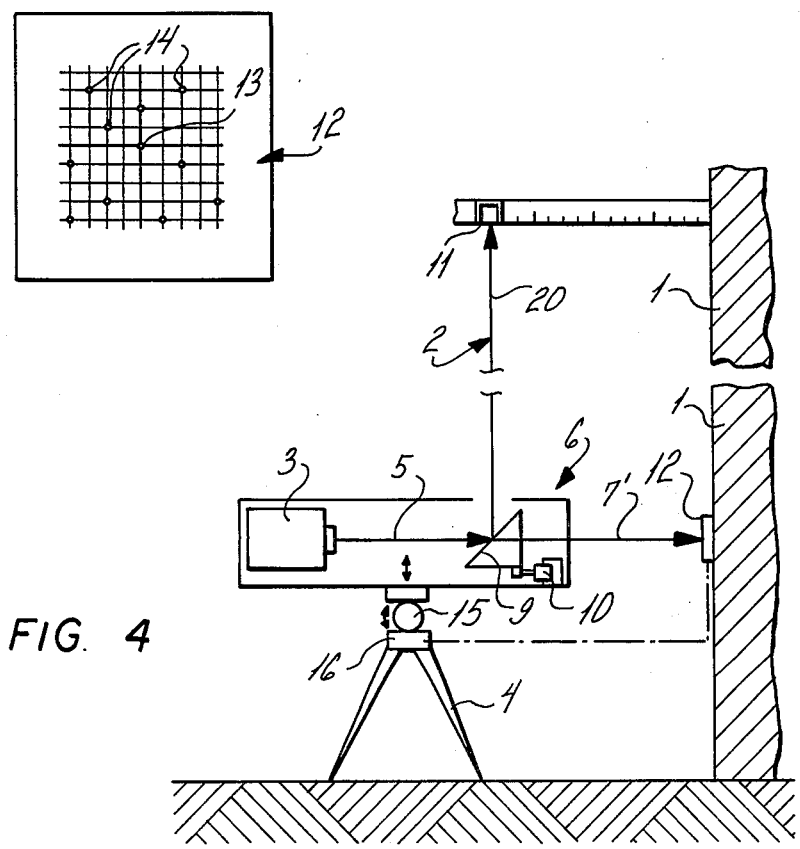

LASER ALIGNMENT APPARATUS

FIELD OF THE INVENTION

The present invention relates to a laser alignment apparatus. More particularly this invention concerns a laser system for ascertaining if a building is being erected perfectly along the vertical.

BACKGROUND OF THE INVENTION

A laser beam defines a substantially perfectly straight line. It has been found extremely practical when building tall objects, making deep excavations, digging tunnels, and the like, to use a fixed laser beam as a reference to allow the work to be conducted along a given straight path. This system is particularly useful in the erection of tall buildings where a vertical laser beam is projected up at a slight distance outwardly from a side of the building. It is possible by means of a very simple measurement at any level to determine the deviation of the building from this vertical reference line.

This is typically achieved by positioning a projector on the ground at the bottom of the building being erected. During the original setup the device is meticulously adjusted so that the beam is projected or reflected perfectly vertically. Thereafter a laser receiver, or indeed even a simple yardstick, can be used to measure the horizontal distance between this perfectly vertical laser beam and the side of the building. Such a system is disclosed in German Patent publication 2,403,239, whose entire disclosure is herewith incorporated.

The difficulty with such a system is that the beam can become misaligned. This happens rather frequently in a building site due to the frequently unstable ground conditions and the considerable amount of work going on around the projector. In case of such misalignment it is necessary totally to realign the device and usually establish a new set of measurements for use after the realignment.

OBJECTS OF THE INVENTION

It is therefore an object of the present invention to provide an improved laser alignment apparatus.

Another object is to provide such an apparatus which will always generate a substantially perfectly positioned test beam, even if the projector is physically disturbed or limitedly displaced.

SUMMARY OF THE INVENTION

These objects are attained according to the instant invention in an apparatus which carries out an alignment method comprising the steps of projecting a main laser beam from a source and then splitting this main beam into a test beam and an adjustment beam, each lying at a respective predetermined fixed angle to the main beam. The test beam is received at a station remote from the source for alignment of an object at this station. A receiving location is established remote from the source along the adjustment beam and offset from the test beam. Any deviation of the adjustment beam off this location is detected. Thus, the receiving location forms a reference for the alignment. The source and therewith the main beam are automatically repositioned on detection of any deviation of the adjustment beam at the receiving location to realign the adjustment beam at the location and thereby realign the reference.

With this system, therefore, the reference is established not simply by positioning the source, but also by positioning at a station remote from the source a detector which is constituted as an array of receptors at the center of which is a receptor corresponding to the reference receiving location. The further this detector is placed from the generator, the more accurate will be the positioning of the beams generated by the source. In addition, the likelihood of any perturbation or interference with this type of alignment system is enormously reduced.

According to the instant invention, the main beam is normally generated horizontally and then deflected orthogonally to form the test beam. The adjustment beam may also be reflected orthogonally from the main beam, or may be coaxial with the main beam simply by deflecting the main beam with a semireflecting mirror. In fact the main beam may fully be reflected by a completely reflecting mirror that is continuously moved so that the beam effectively forms a plane and constitutes in a portion of the plane the adjustment beam, and in another portion of the plane the test beam.

The test beam normally is projected perfectly vertically upwardly for use in ascertaining whether a building being erected is in proper alignment with the vertical. In such an arrangement the detector is horizontally aligned with the main beam, so that the adjustment and test beams are 90° offset from each other and from the main beams. It is possible in accordance with this invention to use two detectors flanking the source and each responding to a respective test beam. This type of system allows extraordinary accuracy to be obtained in the formation of the vertical test beam.

BRIEF DESCRIPTION OF THE DRAWING

FIG. 3 is a view similar to FIG. 1 showing another arrangement in accordance with this invention;

FIG. 4 is a vertical section through the arrangement of of FIG. 3; and

FIG. 5 is a front view of a detector according to this invention.

SPECIFIC DESCRIPTION

Figure 1:
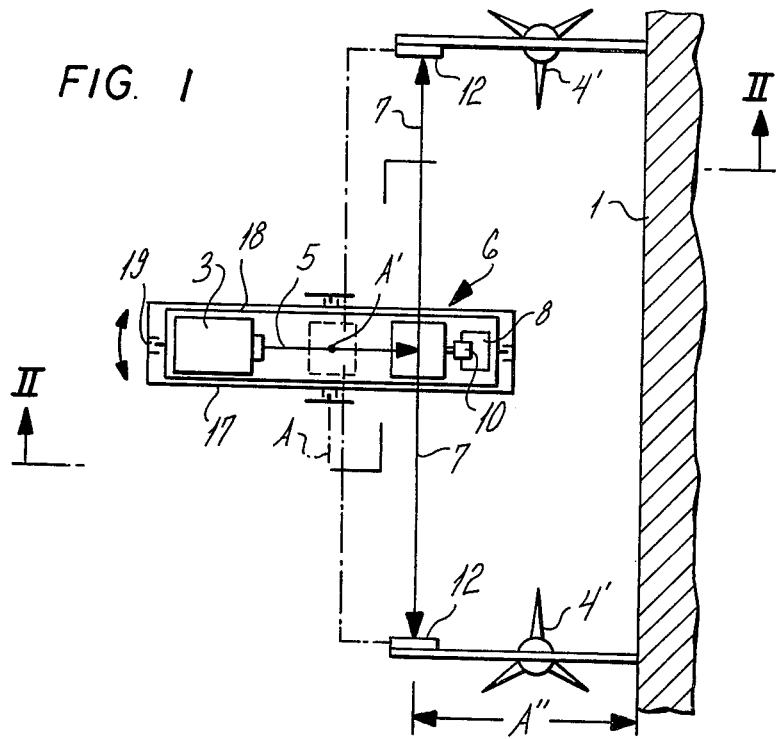
FIG. 1 is the top view of the apparatus according to this invention.
Figure 2:
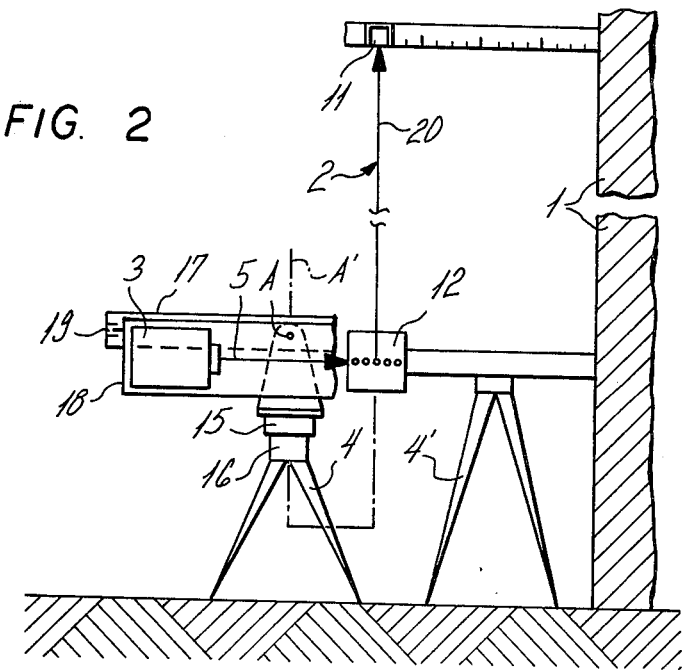
FIG. 2 is a section taken along line II—II of FIG. 1.

FIGS. 1 and 2 show an arrangement used to align a building 1 with a vertical line 2. A laser-beam source or projector 3 is carried in a housing 18 mounted via gimbals 19 in another housing 17 supported on a tripod 4 for rocking about a horizontal axis A and swiveling about a vertical axis A'. The source 3 generates a laser beam 5 reflected by a reflector or mirror 6 upwardly as a test beam 20 lying on the vertical line 2. This reflector 6 forms a part of a reflecting arrangement 8 having a drive motor 10 that also splits the beam 5 into a horizontal adjustment beam 7 by means of the mirror 6.

The building 1 is provided in its upper levels with a receiver 11, which is used to determine the spacing A" between the building 1 and the vertical line 2 formed by the beam 20.

According to the instant invention, the projector is flanked by a pair of detectors 12 carried on respective supports 4', and each having as shown in FIG. 5 a central receptor 13 surrounded by an array of deviation receptors 14, all of the diode type that conduct when impinged by the laser beam of the source 3. These detectors 12 are both connected to a controller 16, connected in turn to a positioning motor 15 that can displace the housing 17 and with it the projector 3 and reflecting arrangement 6 about the axes A and A'.

In use the beam 5 is spread so as to constitute the beams 7 and 20, with the central receptors 13 lying perfectly coaxially in line with each other on a line perpendicular to the main beam 5, and the vertical beam 20 lying perpendicular to the beams 7 and 5.

For initial setup, the housing 17 is set so that the beam 5 is perfectly horizontal, and the device is operated while the two detectors 12 are positioned until the receptors 13 respond to the reflected adjustment beam 7. The beam 20 will be perfectly vertical. Thereafter, even if the housings 17 and 18 are disturbed, the controller 16 will operate the positioning motor 15 to realign the beam 5 so that the adjustment beams 7 are perfectly parallel to the wall of the building 1 and the beam 20 is perfectly vertical. In fact, the main laser beam 5 is split up so as to be reflected in a fan having a lower edge at the receptors 13. If the arrangement is disturbed so that some of the receptors 14 start to receive the laser adjustment beam 7, a computer automatically calculates the perturbation, generates error signals and automatically operates the motor 15 to reset the beam 5.

The arrangement of FIGS. 3 and 4 is substantially identical, except that only a single detector 12 is used, and the reflective surface 9 is semitransparent so that an adjustment beam 7' is formed which is coaxial with the beam 5 and perpendicular to the beam 2. This allows the detector 12 to be mounted directly on the wall of the building 1 for extreme setup ease and accuracy of operation. In such an arrangement the projector 3 need merely be pivotal around a horizontal axis for adjustment in case the adjustment beam 7' deviates from the center receptor 13.

I claim:

1. An apparatus for aligning an object with the vertical, said apparatus comprising:
    a support adapted to be positioned adjacent the object to be aligned;
    a housing limitedly tippable on said support;
    means on said housing for projecting a main laser beam horizontally toward said object;
    means on said housing including a mirror along and lying at an angle of 45° to the axis of said main beam and means for rotating said mirror about the main beam for splitting said main beam into a vertical and upwardly directed test beam orthogonal to said main beam and a horizontal adjustment beam orthogonal to said test beam;
    means on said object remote from said housing for receiving said test beam for alignment of said object;
    detecting means including at least one central receptor at a predetermined fixed location along said adjustement beam and offset from said test beam and a plurality of deviation receptors surrounding said central receptor for receiving said adjustment beam;
    positioning means between said support and said housing for displacing said housing on said support and thereby moving said adjustment and test beams; and
    control means connected between said detecting means and said positioning means for tipping said housing on said support when one of said deviation receptors receives said adjustment beam for realigning said adjustment beam with said central receptor.

2. The apparatus defined in claim 1, further comprising a second such detecting means facing the first-mentioned detecting means and offset horizontally by 180° therefrom relative to said main-beam axis.

* * * * *